(12) United States Patent
Ide et al.

(10) Patent No.: US 8,412,884 B1
(45) Date of Patent: Apr. 2, 2013

(54) STORAGE SYSTEM AND METHOD OF CONTROLLING STORAGE SYSTEM

(75) Inventors: Kyohei Ide, Tokyo (JP); Sumihiro Miura, Tokyo (JP); Naoki Moritoki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 15 days.

(21) Appl. No.: 13/265,943

(22) PCT Filed: Oct. 13, 2011

(86) PCT No.: PCT/JP2011/005725
§ 371 (c)(1),
(2), (4) Date: Oct. 24, 2011

(51) Int. Cl.
*G06F 12/00* (2006.01)
*G06F 13/00* (2006.01)
*G06F 13/28* (2006.01)

(52) U.S. Cl. .................. 711/113; 711/129; 711/154

(58) Field of Classification Search .......... 711/112–113, 711/129, 154
See application file for complete search history.

(56) References Cited

U.S. PATENT DOCUMENTS

| 5,983,023 | A | 11/1999 | Moriwaki et al. |
| 6,415,355 | B1 * | 7/2002 | Hirofuji .................. 711/114 |
| 2001/0029572 | A1 | 10/2001 | Ooishi |
| 2007/0288692 | A1 | 12/2007 | Bruce et al. |

FOREIGN PATENT DOCUMENTS

| JP | 10-207769 A | 8/1998 |
| JP | 2004-355810 A | 12/2004 |
| JP | 2006-127251 A | 5/2006 |

* cited by examiner

*Primary Examiner* — Matthew Bradley
*Assistant Examiner* — Ryan Bertram
(74) *Attorney, Agent, or Firm* — Volpe and Koenig, P.C.

(57) ABSTRACT

It is provided a storage system for storing data requested by a host computer to be written, the storage system comprising: at least one processor, a cache memory and a cache controller. The cache memory includes a first memory which can be accessed by way of either access that can specify an access range by a line or access that continuously performs a read and a write. The cache controller includes a second memory which has a higher flexibility than the first memory in specifying an access range. The cache controller determines an address of an access destination upon reception of a request for an access to the cache memory from the at least one processor, and switches a request for an access to a specific address into an access to a corresponding address in the second memory.

8 Claims, 17 Drawing Sheets

Fig. 5

| SRAM ADDRESS | DRAM ADDRESS |
|---|---|
| 000000-0001ff | 10000000-100001ff (CONTROL INFORMATION ON DRAM 0) |
| 000200-0003ff | 10000300-100004ff (CONTROL INFORMATION ON DRAM 1) |
| 000400-0005ff | 10000600-100007ff (CONTROL INFORMATION 0 ON OVERALL SYSTEM) |
| 000600-0006ff | 10000900-100009ff (CONTROL INFORMATION 1 ON OVERALL SYSTEM) |

MAPPING INFORMATION

Fig. 6

| ADDRESS IN STORAGE DEVICE | ADDRESS IN CACHE MEMORY |
|---|---|
| ADDRESS_0 | ADDRESS_0 |
| ADDRESS_1 | ADDRESS_1 |
| ADDRESS_2 | ADDRESS_2 |

CACHE MEMORY MANAGEMENT INFORMATION

CACHE MEMORY CONFIGURATION INFORMATION

STATISTICS INFORMATION

Fig. 15

| SRAM ADDRESS | DRAM ADDRESS |
|---|---|
| 000000-0001ff | 10000000-100001ff<br>(CONTROL INFORMATION ON DRAM 0) |
| 000200-0003ff | 10000300-100004ff<br>(CONTROL INFORMATION ON DRAM 1) |
| 000400-0005ff | 10000600-100007ff<br>(CONTROL INFORMATION ON DRAM 2) |
| 000600-0006ff | 10000900-100009ff<br>(CONTROL INFORMATION 0 ON OVERALL SYSTEM) |
| 000700-0007ff | 10000a00-10000aff<br>(CONTROL INFORMATION 1 ON OVERALL SYSTEM) |

MAPPING INFORMATION(AFTER UPDATE)

Fig. 17

| SRAM ADDRESS | DRAM ADDRESS |
|---|---|
| 000000-0001ff | 10000000-100001ff<br>(CONTROL INFORMATION ON DRAM 0) |
| 000200-0002ff | 10000900-100009ff<br>(CONTROL INFORMATION 1 ON OVERALL SYSTEM) |
| 000300-0004ff | 10001000-100011ff<br>(CONTROL INFORMATION 0<br>WITH HIGH ACCESS FREQUENCY) |
| 000500-0005ff | 10001200-100012ff<br>(CONTROL INFORMATION 1<br>WITH HIGH ACCESS FREQUENCY) |

MAPPING INFORMATION (AFTER UPDATE)

STORAGE SYSTEM AND METHOD OF CONTROLLING STORAGE SYSTEM

TECHNICAL FIELD

This invention relates to a storage system.

BACKGROUND ART

A storage system includes a cache memory which enables speedy reading or writing data requested by a host computer for read or write to improve responsivity to the host computer. The cache memory stores user data to be written to a storage device and, in addition, control information to control operation of the storage system.

A cache memory is typically configured with a volatile DRAM. There are three ways to access the DRAM: (1) read, (2) write, and (3) read-modify-write (RMW); one of the three ways is selected to access data held in the DRAM.

In a read, the address from which data is to be read and the data length are specified, so that the data at the address in the specified range is transferred in burst mode in units of lines of the DRAM. In other words, a line read accesses data by a predetermined data length; accordingly, even if an access to a small amount of data is intended, the operation results in accessing data preceding and subsequent to the target data inclusively.

In a read-modify-write, a small amount of data can be accessed, but a single command results in a read and a write performed in a series of operation; accordingly, unnecessary operation may be performed in reading data held in the DRAM or writing data to the DRAM.

For this reason, desired is a speedy access to a small amount of data held in a cache memory in some way other than the read-modify-write.

For such a speedy access to a cache memory, some techniques have been proposed that hierarchically provide a cache of an SRAM. For example, JP 2006-127251 A discloses a technique that employs an SRAM, which is smaller than a DRAM in size, as a cache memory to improve performance in memory access.

JP H10-207769 A discloses a cache memory including an SRAM cache memory, which operates at high speed, and a DRAM cache memory having a large storage capacity.

JP 2004-355810 A discloses a semiconductor storage device in which data frequently used is stored in a main cache (SRAM), data which is less frequently used in the data stored in the main cache is stored in a sub cache (SRAM), and the cached data is returned to a main memory (DRAM) in an interval between refresh operations or transfer operations of the main memory.

SUMMARY OF INVENTION

Technical Problem

As described, a cache memory in a storage system stores user data and control information.

As to the control information stored in the cache memory, the required amount of data of the control information may be small depending on the operating condition of the storage system. In such a case, a problem arises that the access time is long in any way of access.

In the meanwhile, control of a storage system has recently been more complex; consequently, a variety of operations require frequent accesses to the control information. For example, in a variety of operations, statistics information to count the frequency of the processing is updated; accordingly, an access to the control information conflicts with an access to user data, so that the access to the control information is suspended to cause a bottleneck in operations, which may adversely affect the responsivity in the storage system.

In view of the above-described circumstances, in a storage system which is equipped with a cache memory including both of a speedy and expensive SRAM, which can be accessed in any units, and an inexpensive DRAM, which can be accessed in fixed units and requires read-modify-write control (RMW control), and stores control information and user data in the cache memory, demanded is a management technique for a cache memory that uses either the SRAM or the DRAM as appropriate.

Solution to Problem

A representative embodiment of the invention disclosed in this application maps the storage area of a cache memory in such a manner that control information having short data lengths and accessed frequently will be stored in an SRAM.

That is a storage system for storing data requested by a host computer to be written, the storage system comprising a host interface coupled to the host computer, a storage device for storing the data requested by the host computer to be written, a disk interface connected to the storage device, at least one processor for processing the data requested to be written, a cache memory for storing the data requested by the host computer to be written, and a cache controller for controlling data inputs to and outputs from the cache memory. The cache memory includes a first memory which can be accessed by way of either access that can specify an access range by a line or access that continuously performs a read and a write. The cache controller includes a second memory which has a higher flexibility than the first memory in specifying an access range. The cache controller determines an address of an access destination upon reception of a request for an access to the cache memory from the at least one processor, and switches a request for an access to a specific address into an access to a corresponding address in the second memory.

Advantageous Effects of Invention

A representative aspect of this invention can improve performance in accessing a cache memory.

BRIEF DESCRIPTION OF DRAWINGS

FIG. 5 is a drawing illustrating an example of mapping information in the window register in this embodiment of this invention.

FIG. 6 is a drawing illustrating an example of cache memory management information according to the embodiment of this invention.

FIG. 15 is an explanatory diagram for illustrating an example of mapping information according to the embodiment of this invention.

FIG. 17 is an explanatory diagram for illustrating an example of mapping information according to the embodiment of this invention.

DESCRIPTION OF EMBODIMENTS

A disk array apparatus will be explained by way of an embodiment of a storage system of this invention.

Figure 1:
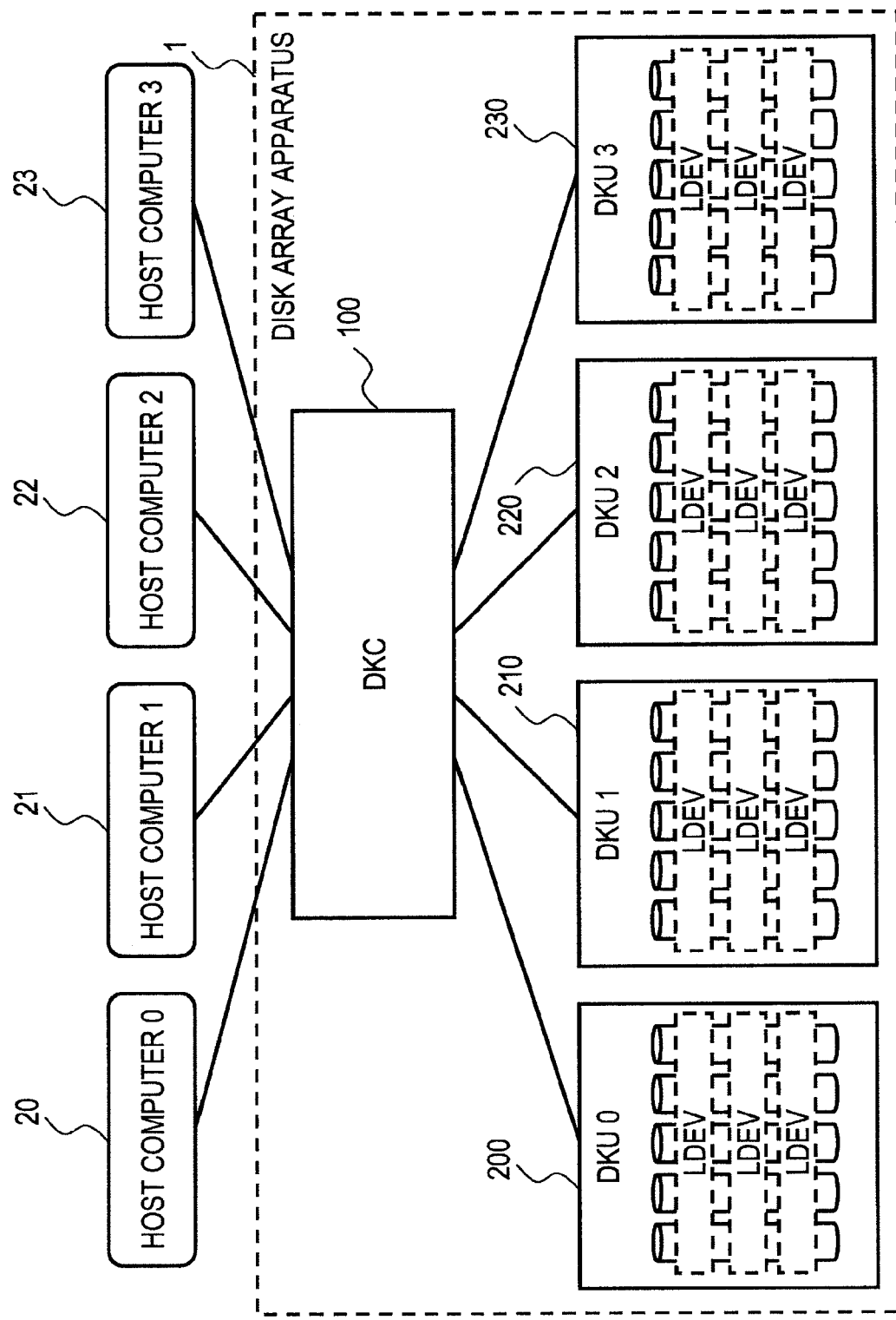
FIG. 1 is a block diagram illustrating a configuration of a disk array apparatus according to an embodiment of this invention.

FIG. 1 is a block diagram illustrating a configuration of a disk array apparatus according to the embodiment of this invention.

The disk array apparatus 1 in this embodiment includes a disk controller (DKC) 100 and a plurality of disk units (DKUs) 200, 210, 220, and 230.

The disk controller 100 is connected to a plurality of host computers 20, 21, 22, and 23. The details of the disk controller 100 will be explained using FIG. 2.

Each of the plurality of host computers 20, 21, 22, and 23 is a computer including a processor, a memory, and an interface. For example, it transmits a data access request issued by an application program to the disk array apparatus 1.

The disk unit 200 is composed of a plurality of magnetic disk drives (storage devices) and stores user data requested by, for example, the host computer 20. The plurality of magnetic disk drives provide logical disks (LDEVs) configured with a RAID not to lose user data even if some failure occurs to at least one of the magnetic disk drives. Although explanations on the configurations and the functions of the disk units 210, 220, and 230 are omitted, they have the same configuration and function as the disk unit 200.

Figure 2:
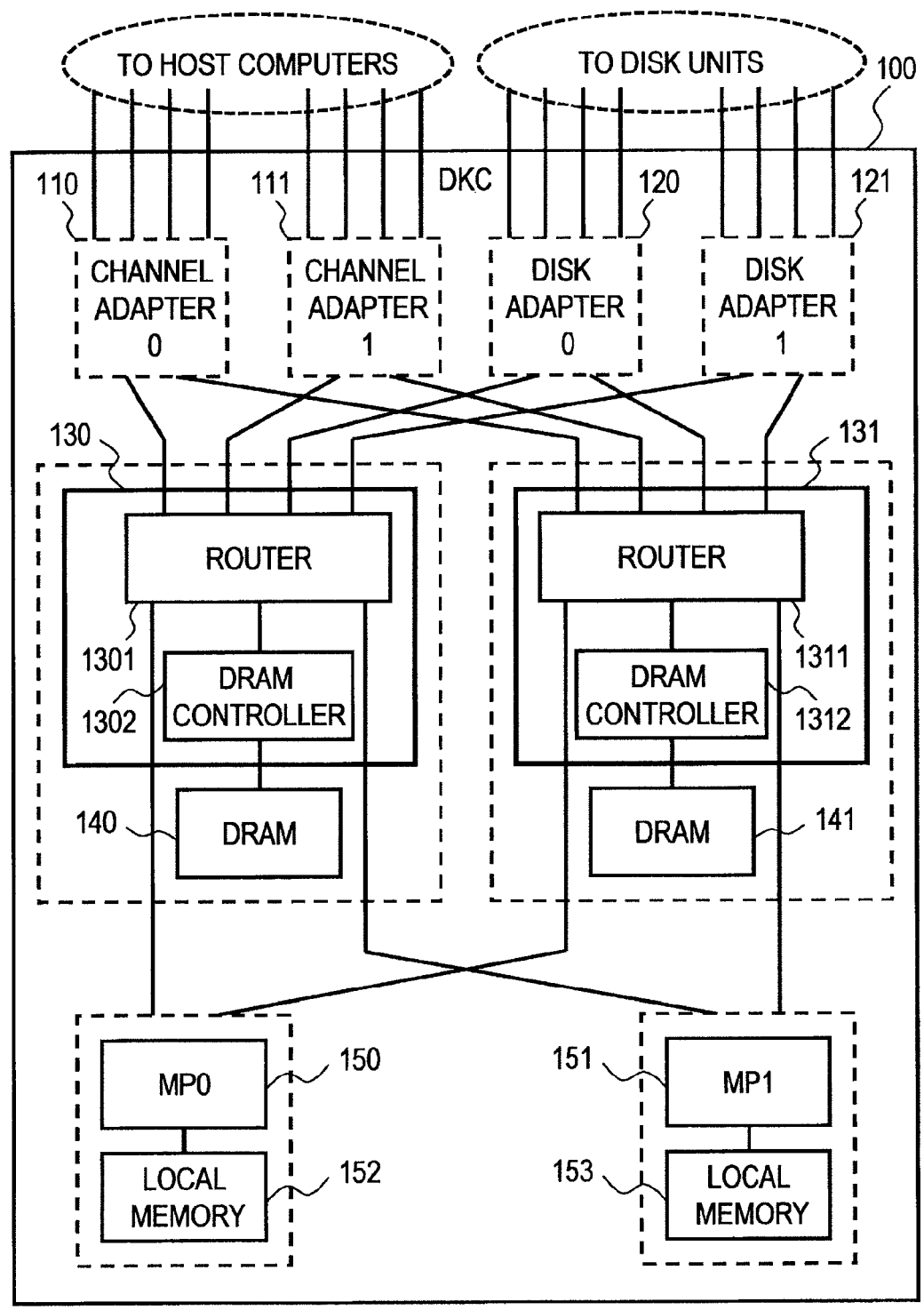
FIG. 2 is a block diagram illustrating a configuration of the disk controller according to the embodiment of this invention.

FIG. 2 is a block diagram illustrating a configuration of the disk controller 100 according to the embodiment of this invention.

The disk controller 100 includes a plurality of channel adapters 110 and 111, a plurality of disk adapters 120 and 121, a plurality of cache controllers 130 and 131, a plurality of cache memories (DRAMs) 140 and 141, a plurality of microprocessors 150 and 151, and a plurality of local memories 152 and 153.

Although the disk controller 100 in this embodiment includes a plurality of channel adapters 110 and 111, a plurality of disk adapters 120 and 121, a plurality of cache controllers 130 and 131, a plurality of cache memories 140 and 141, a plurality of microprocessors 150 and 151, and a plurality of local memories 152 and 153, it is sufficient that the disk controller 100 have at least one each of the devices. The numbers of the devices can be one or more than two.

The channel adapters 110 and 111 are interfaces connected to the host computer 20 and the others; they communicate with the host computer 20 and the others by a predetermined protocol such as FC or iSCSI.

The disk adapters 120 and 121 are interfaces connected to the disk units 200 and the others; they communicate with the disk unit 200 and the others by a protocol such as FC, SATA, or SCSI.

The cache controllers 130 and 131 mainly include routers 1301 and 1311 and DRAM controllers 1302 and 1312, respectively, and are configured with, for example, dedicated LSIs. The configuration of the cache controllers will be described later using FIG. 3.

The cache memories 140 and 141 are volatile memories for temporarily storing data requested by a host computer for write before storing it in, for example, the disk unit 200; typically, they are DRAMs. Accordingly, the data stored in, for example, the cache memory 140 is lost when the power is cut off. As previously described, the cache memories 140 and 141 store control information for controlling operations of the disk array apparatus 1. The control information includes cache memory management information (FIG. 6) indicating whether the requested user data is held in the cache memory 140, configuration information (FIG. 7) indicating the configuration of the devices included in the disk array apparatus 1, and statistics information (FIG. 8) indicating the frequency of access to user data.

The microprocessors 150 and 151 execute programs stored in local memories 152 and 153, respectively, to control operations of the controller. The local memories 152 and 153 store the programs executed by the microprocessors 150 and 151, respectively.

Figure 3:
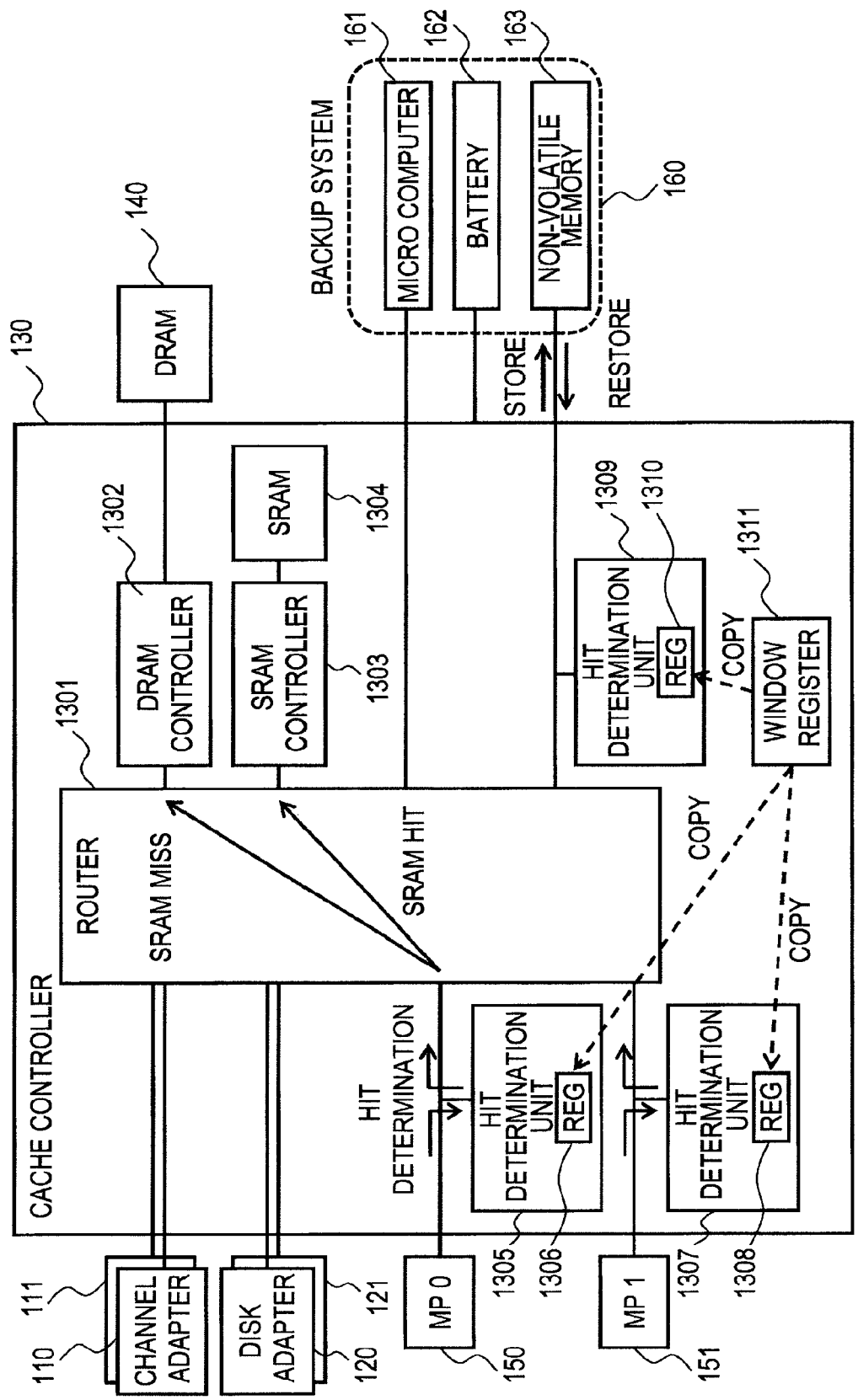
FIG. 3 is a block diagram illustrating a configuration of the cache controller according to the embodiment of this invention.

FIG. 3 is a block diagram illustrating a configuration of the cache controller 130 according to the embodiment of this invention.

The cache controller 130 includes a router 1301, a DRAM controller 1302, an SRAM controller 1303, an SRAM 1304, hit determination units 1305, 1307, and 1309, and a window register 1311.

The cache controller 130 has a plurality of input and output interfaces (ports). The input and output interfaces are connected to, for example, the channel adapters 110 and 111, the disk adapters 120 and 121, and the microprocessors 150 and 151. The cache controller 130 can close the input and output interfaces or release the closure in accordance with a command inputted from an external.

The router 1301 is configured with a switch (for example, a cross bar switch) for distributing packets received by the cache controller 130.

The DRAM controller 1302 is connected to the cache memory (DRAM) 140 and controls writes of user data to the cache memory 140 and reads of user data from the cache memory 140.

The SRAM controller 1303 is connected to the SRAM 1304 and controls writes of data to the SRAM 1304 and reads of data held in the SRAM from the SRAM 1304.

The SRAM 1304 is a non-volatile memory for storing control information used to control operations of the disk array apparatus 1. In this embodiment, the SRAM 1304 is mapped in the memory space of the DRAM 140.

It should be noted that the SRAM 1304 may be disposed outside the cache controller 130, not inside the cache controller 130; however, the SRAM 1304 disposed inside the cache controller 130 can transfer data faster because an interface unit is unnecessary between the SRAM controller 1303 and the SRAM 1304.

The hit determination unit 1305 is provided in the interface of the cache controller 130. It determines whether an access to the cache memory 140 is an access to an address where the SRAM 1304 has been mapped or an access to an address where the SRAM 1304 is not mapped, appends the result of determination to the packet, and outputs the packet.

The hit determination unit 1305 is provided in the interface which receives accesses from the microprocessor 150. This is because the DRAM stores user data and control information and the SRAM 1304 does not store user data but stores control information, and accordingly, it is sufficient that the determination unit be provided in the interface that receives accesses from a device that needs to access control information. For this reason, the hit determination units are installed in the interfaces to receive accesses from the microprocessors 150, 151 and the interface to receive accesses from a backup system 160.

In summary, the hit determination unit 1305 has a function to determine whether an access to the cache memory received by the cache controller 130 is an access to the DRAM 140 or an access to the SRAM 1304.

The hit determination unit 1305 has a register 1306 to be referred to for the foregoing determination on an access. To the register 1306, data is copied from a window register 1311 which is shared in the cache controller 130.

The hit determination units 1307 and 1309 include registers 1308 and 1310, respectively. Although explanations on the configurations and the functions of the hit determination units 1307 and 1309 are omitted, they have the same configuration and functions as the hit determination unit 1305.

The window register 1311 is the data to be referred to in order to determine whether an access to the cache memory received by the cache controller 130 is an access to the DRAM 140 or an access to the SRAM 1304. The data in the widow register 1311 is copied to the registers 1306, 1308, and 1310 in the hit determination units 1305, 1307, and 1309, respectively.

It should be noted that the window register 1311 functions as a master register as will be described later; however, the window register 1311 does not need to be provided if the register in any one of the hit determination units functions as the master.

Specifically, the window register 1311 includes area allocation information indicating the ranges of a user data area and a control information area with the address in the cache memory 140 and mapping information indicating the relationship between addresses in the DRAM 140 and addresses in the SRAM 1304. The area allocation information includes the address of the boundary between the user data area and the control information area and is used to determine whether an access destination is in the user data area or the control information area. The mapping information will be described in detail using FIG. 5.

To the cache controller 130, a backup system 160 is connected. The backup system 160 includes a microcomputer 161, a battery 162, and a non-volatile memory 163.

The microcomputer 161 includes a low-power consumption microprocessor and executes a program held in an internal memory to control data transmissions from the cache memory 140 to the non-volatile memory 163 and from the non-volatile memory 163 to the cache memory 140.

The battery 162 is connected to the cache controller 130 and the backup system 160 through a not shown switch. It supplies electric power to a part of the cache controller 130 (such as the router 1301, the DRAM controller 1302, and the SRAM controller 1303) and the backup system 160 in the event of a power failure. The battery 162 may be a rechargeable secondary cell (such as a nickel-hydride cell or a lithium-ion battery). Instead of the battery 162, a large-value capacitor may be used.

The non-volatile memory 163 is a memory to store data held in the cache memory 140 in the event of a power failure. For example, a non-volatile semiconductor storage device (SSD) may be used.

Figure 4:
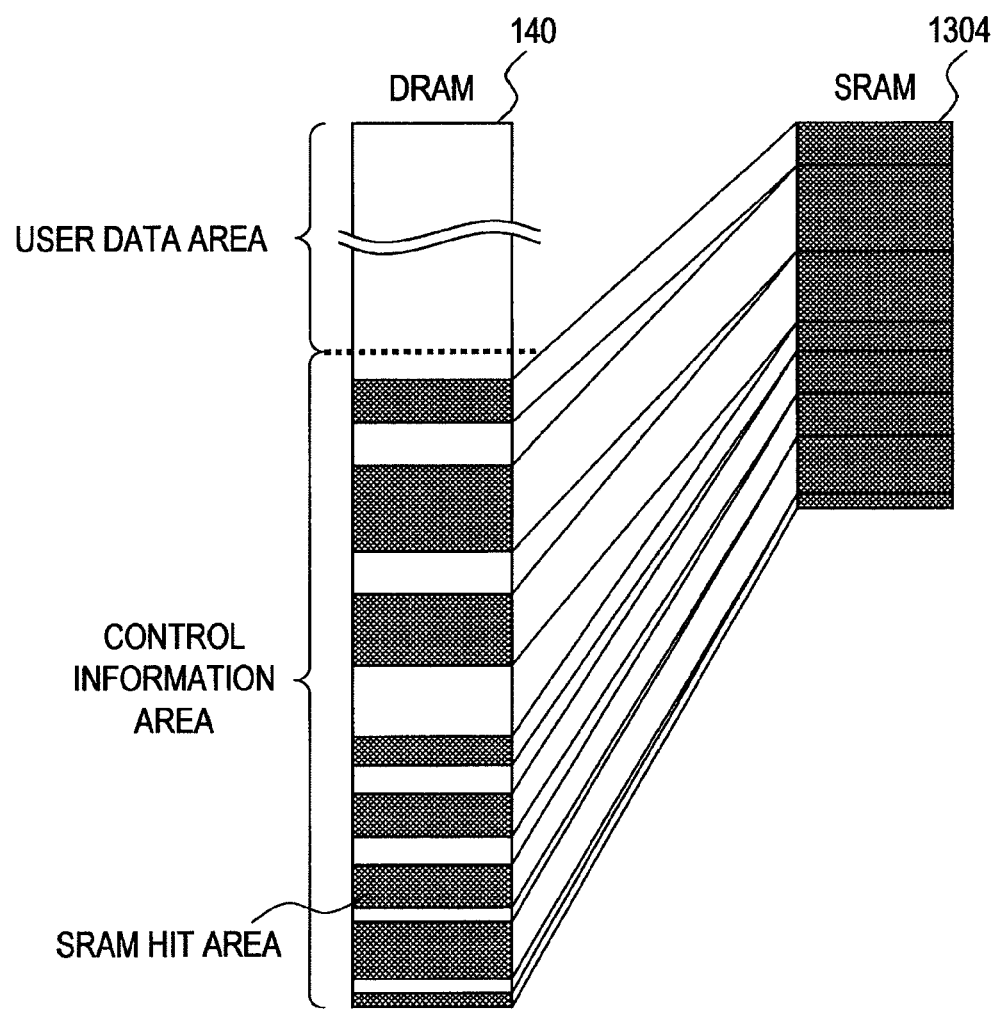
FIG. 4 is a drawing illustrating mapping of the address space of the cache memory in the disk array apparatus according to the embodiment of this invention.

FIG. 4 is a drawing illustrating mapping of the address space of the cache memory 140 in the disk array apparatus according to the embodiment of this invention.

As previously described, the storage area of the SRAM 1304 is mapped in the memory space of the DRAM 140 (the hatched areas in FIG. 4). In other words, the SRAM 1304 has a plurality of windows and the windows are associated with discontinuous (or continuous) areas in the DRAM 140.

Hence, an access to a memory space of the DRAM 140 to which a storage area of the SRAM 1304 has been mapped is determined to be an SRAM HIT and is directed to accessing the storage area of the SRAM 1304 which has been mapped to the memory space of the DRAM 140.

The router 1301 directs an access to an area where the storage area of the SRAM 1304 has been mapped to the SRAM 1304 instead of the DRAM 140. Accordingly, for the areas where the storage area of the SRAM 1304 has been mapped, storage areas in the DRAM 140 are prepared; however, data is not written to those areas but is written to the SRAM 1304.

The determination method of the mapping will be explained using FIG. 13.

FIG. 5 is a drawing illustrating an example of mapping information in the window register 1311 according to the embodiment of this invention.

The window register 1311 includes mapping information between the addresses of the DRAM 140 and the addresses of the SRAM 1304. For example, in the first line of the window register (mapping information) 1311 shown in FIG. 5, mapping information on the address of the first window is defined; specifically, the address "000000-0000ff" in the SRAM 1304 is mapped to the address "10000000-100000ff" in the DRAM 140.

As understood from FIG. 5, the address spaces of the windows can be different in size. In addition, the window register 1311 in FIG. 5 shows that the addresses of the SRAM 1304 are mapped to the address space of the DRAM 140 discontinuously, but may be mapped continuously.

Furthermore, as shown in FIG. 5, the window register 1311 may include data indicating the substance of information held in each storage area.

As described, the storage areas of the SRAM 1304 are mapped to the address space of the DRAM 140. Accordingly, for example, the microprocessor 150 can access a storage area of the SRAM 1304 mapped to a memory area of the DRAM 140 by merely accessing the DRAM 140.

The mapping information shown in FIG. 5 includes registrations of only the storage areas of the DRAM 140 where the storage area of the SRAM 1304 have been mapped but may include registrations of storage areas of the DRAM 140 where the storage areas of the SRAM 1304 are not mapped.

FIG. 6 is a drawing illustrating an example of cache memory management information according to the embodiment of this invention.

The cache memory management information associates logical block addresses of the storage devices accessed by host computers with the addresses of the cache memory 140 holding cache data. Although not shown in the drawing, the cache memory management information may include information indicating the attribute of data held in the cache memory 140 (such as dirty data which has not been written to a storage device or clean data which has been written to a storage device).

The cache memory management information is included in the control information stored in the cache memory 140.

Figure 9:
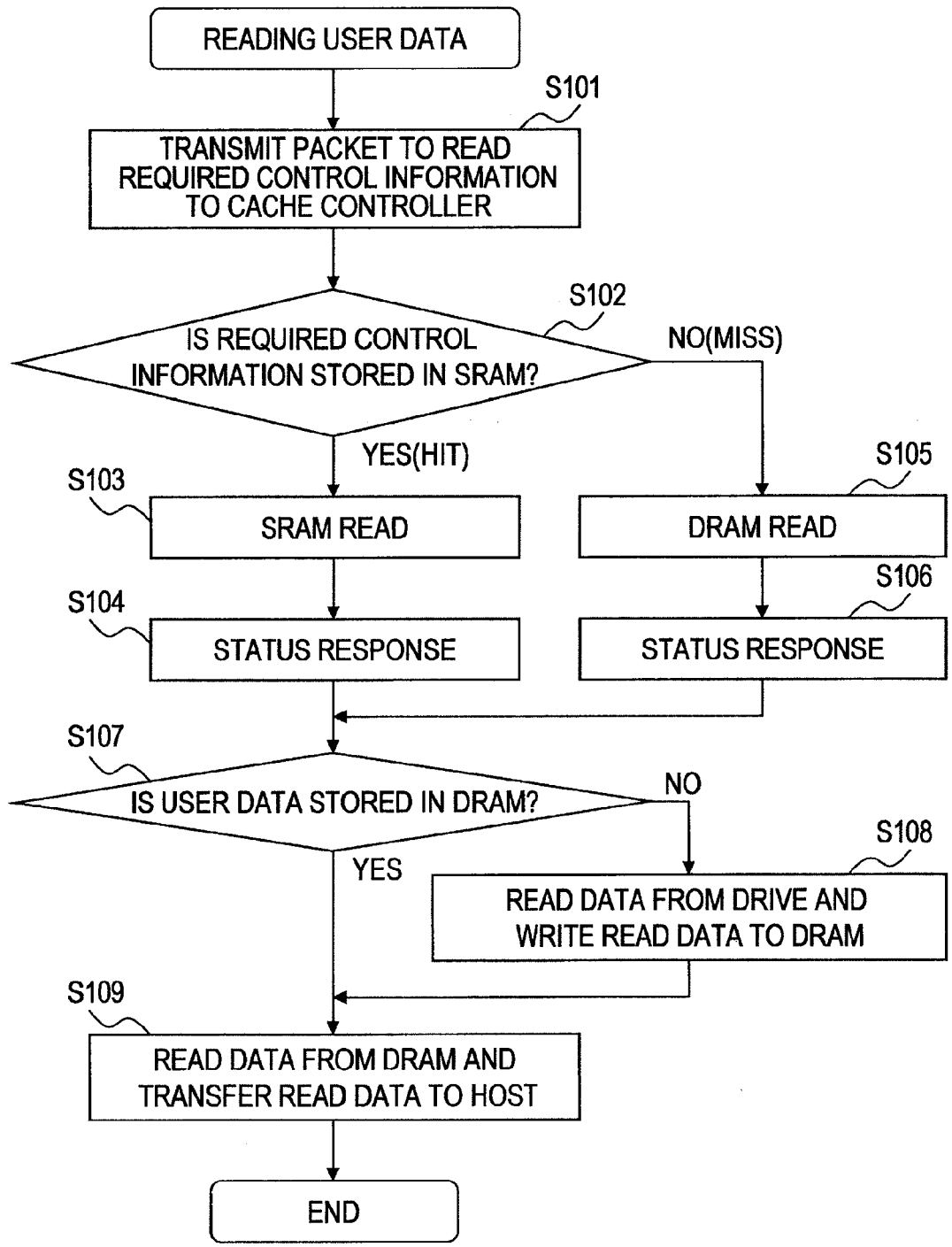
FIG. 9 is a flowchart of reading user data in the disk array apparatus according to the embodiment of this invention.
Figure 10:
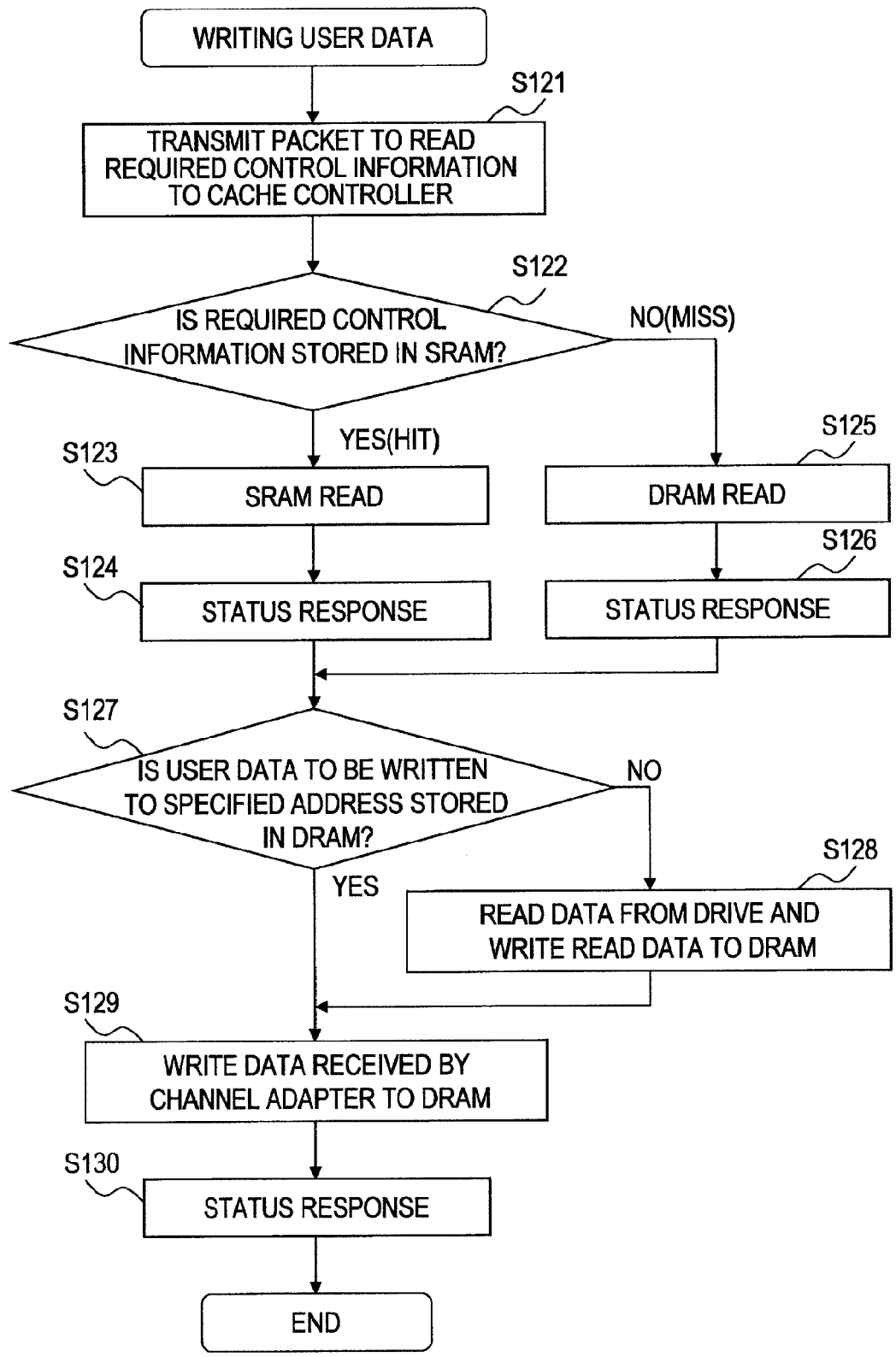
FIG. 10 is a flowchart of writing user data in the disk array apparatus according to the embodiment of this invention.

The cache memory management information is referred to by the cache controller 130 to determine whether the data requested to be accessed from a host computer is held in the cache memory (cache hit) or not (cache miss hit) (refer to S107 in FIG. 9 and S127 in FIG. 10).

Figure 7:
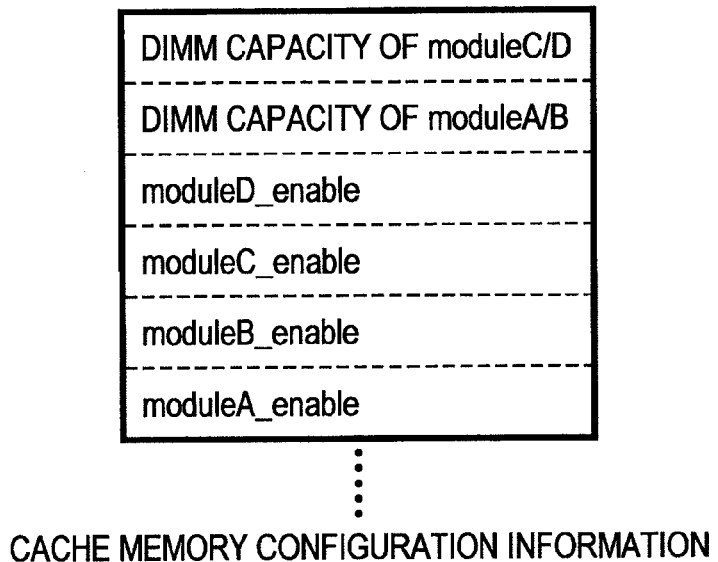
FIG. 7 is a drawing illustrating an example of configuration information (configuration information on the cache memory) according to the embodiment of this invention.

FIG. 7 is a drawing illustrating an example of configuration information (configuration information on the cache memory) according to the embodiment of this invention.

The cache memory configuration information in this embodiment shows an example in which the cache memory 140 is configured with dual inline memory modules (DIMMs) and includes the capacities (for example, in byte) of the modules included in the disk array apparatus 1 and information on whether the individual modules are available for use (for example, one-bit enablement bits).

The cache memory configuration information is included in the control information stored in the cache memory 140. The configuration information may be stored in an internal register in the cache controller 130.

The configuration information is updated when a device is added to or removed from the disk array apparatus 1 and is referred to when information on the performance of the devices included in the disk array apparatus 1 is needed. Particularly in this embodiment, the configuration information is used by the microprocessor 150 to determine whether to store control information to the DRAM 140 or the SRAM 1304 (refer to FIG. 14).

Figure 8:
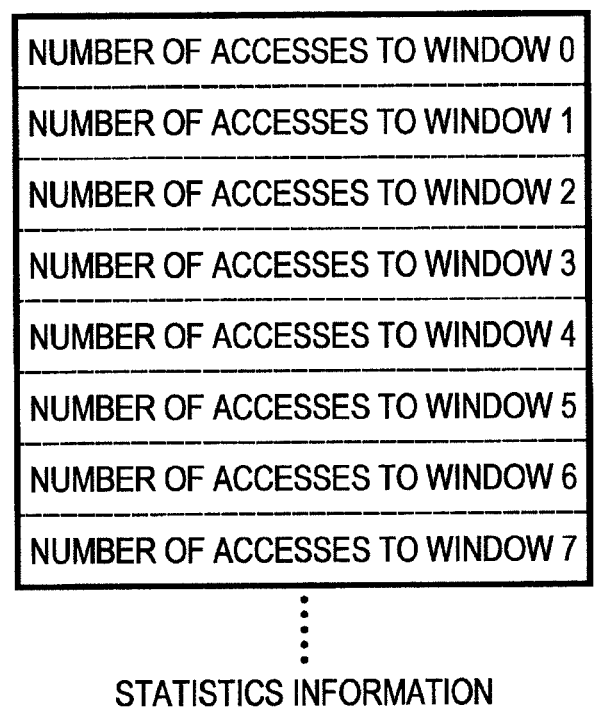
FIG. 8 is a drawing illustrating an example of statistics information according to the embodiment of this invention.

FIG. 8 is a drawing illustrating an example of statistics information according to the embodiment of this invention.

The statistics information in this embodiment includes a counter to record the number of accesses to each window of the SRAM 1304.

This statistics information is included in the control information stored in the cache memory 140. The statistics information may be stored in an internal register in the cache controller 130. Alternatively, the statistics information may be stored in the local memory 152 and managed by the microprocessor 150.

Although the statistics information shown in FIG. 8 manages the number of accesses, it should be noted that the statistics information may manage the number of accesses in each way of access (read or write). Alternatively, the statistics information may manage the number of accesses to each kind of control information, although the statistics information shown in FIG. 8 manages the number of accesses to each window.

Figure 16:
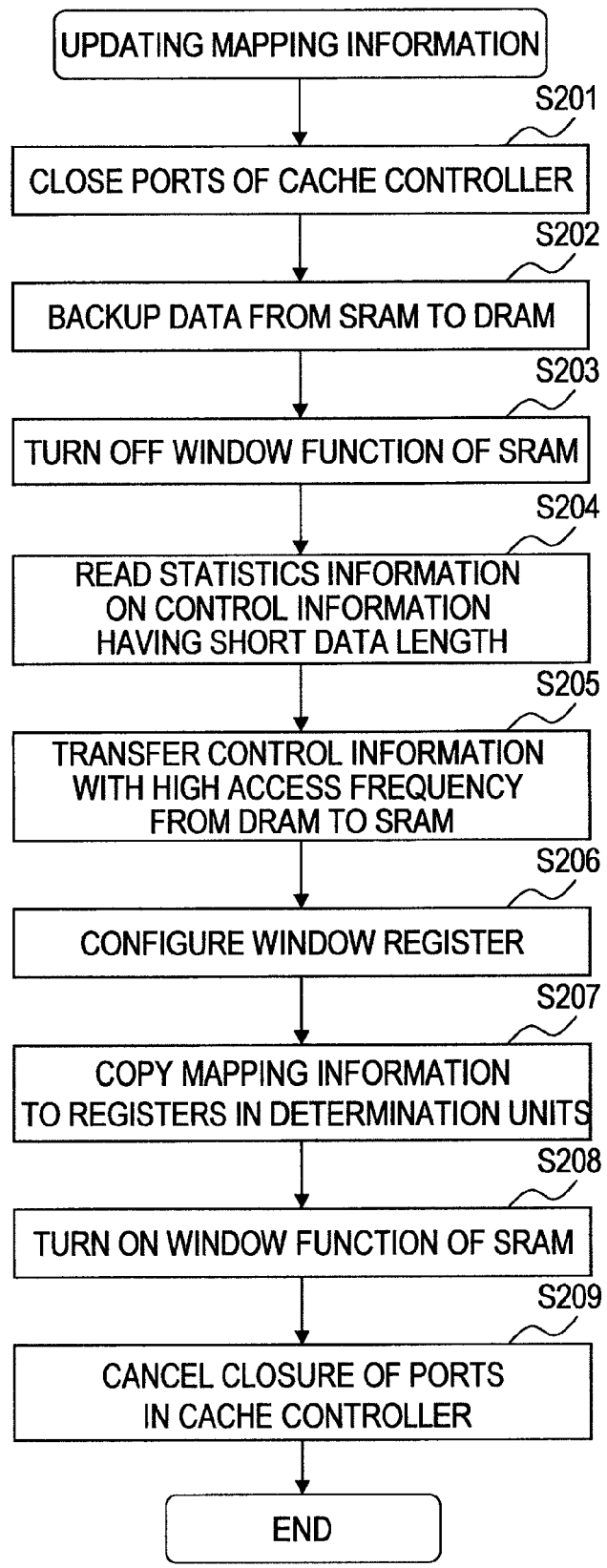
FIG. 16 is a flowchart of another process of updating mapping information according to the embodiment of this invention.

The statistics information is used by the microprocessor 150 to determine whether to store each kind of control information to the DRAM 140 or the SRAM 1304 (refer to FIG. 16).

FIG. 8 only shows the number of accesses to each window in the SRAM 1304 (each storage area mapped in the SRAM 1304), but the number of accesses to the storage areas not mapped in the SRAM 1304 (storage areas in the DRAM 140 holding control information) may be recorded. Such a configuration can show that some area not mapped in the SRAM 1304 is frequently accessed.

FIG. 9 is a flowchart of reading user data in the disk array apparatus 1 according to the embodiment of this invention.

The reading illustrated by FIG. 9 is triggered by an event that the disk array apparatus 1 receives a command issued by, for example, the host computer 20 to read user data. Explanation will be given assuming that the microprocessor 150 and the cache controller 130 mainly execute the process, but the microprocessor 151 and the cache controller 131 may execute the process.

Upon receipt of a command issued by the host computer 20 to read user data, the microprocessor 150 transmits a packet to the cache controller 130, requesting the cache controller 130 to retrieve control information required to read the user data from the cache memory 140 (S101). The control information requested by the microprocessor 150 at this step is the cache memory management information indicating whether the requested user data is held in the cache memory 140 and the statistics information indicating the access frequency to individual user data.

The cache controller 130 determines whether the control information requested by the microprocessor 150 is held in the SRAM 1304 (S102).

In the case of an SRAM HIT (where the requested control information is held in the SRAM 1304), the cache controller 130 replaces the address of the cache memory (DRAM) 140 with the address of the SRAM 1304, retrieves the data from the SRAM 1304 (S103), and transmits the retrieved data to the microprocessor 150 as a status response (S104).

On the other hand, in the case of an SRAM MISS (where the requested control information is not held in the SRAM 1304), the cache controller 130 retrieves the data from the specified address of the cache memory (DRAM) 140 (S105) and transmits the retrieved data to the microprocessor 150 as a status response (S106).

Next, the microprocessor 150 refers to the control information retrieved from the DRAM 140 or the SRAM 1304 to determine whether the requested user data is held in the cache memory 140 (S107).

As a result of determination, if the requested user data is held in the cache memory 140, the microprocessor 150 proceeds to step S109. On the other hand, if the requested user data is not held in the cache memory 140, the microprocessor 150 retrieves the user data from, for example, the disk unit 200, writes the retrieved data to the cache memory 140 (S108), and proceeds to step S109. Specifically, at step S108, the microprocessor 150 requests the disk adapter 120 to turn on the DMA. The disk adapter 120 transfers the data held in a storage device such as the disk unit 200 to a memory in the disk adapter 120 by DMA. The disk adapter 120 transfers the data received from the storage device from the memory in the disk adapter 120 to the cache memory 140 by DMA.

At step S109, the microprocessor 150 retrieves the user data from the cache memory 140 and transfers the retrieved data to the host computer 20. Specifically, the microprocessor 150 requests the channel adapter 110 to turn on DMA. The DMA in the channel adapter 110 retrieves the data held in the cache memory 140 and transfers the retrieved data to the memory in the channel adapter 110 by DMA. The protocol chip in the channel adapter 110 transfers the data received from the cache memory 140 from the memory in the channel adapter 110 to the host computer 20.

FIG. 10 is a flowchart of writing user data in the disk array apparatus 1 according to the embodiment of this invention.

The writing illustrated by FIG. 10 is triggered by an event that the disk array apparatus 1 receives a command issued by, for example, the host computer 20 to write user data. Explanation will be given assuming that the microprocessor 150 and the cache controller 130 mainly execute the process, but the microprocessor 151 and the cache controller 131 may execute the process.

Upon receipt of a command issued by the host computer 20 to write user data, the microprocessor 150 transmits a packet to the cache controller 130, requesting the cache controller 130 to retrieve control information required to write the user data from the cache memory 140 (S121). The control information requested by the microprocessor 150 at this step is the cache memory management information indicating whether the user data requested to be written to the specified address is held in the cache memory 140 and the statistics information indicating the access frequency to individual user data.

The cache controller 130 determines whether the control information requested by the microprocessor 150 is held in the SRAM 1304 (S122).

In the case of an SRAM HIT (where the requested control information is held in the SRAM 1304), the cache controller 130 replaces the address of the cache memory (DRAM) 140 with the address of the SRAM 1304, retrieves the data from the SRAM 1304 (S123), and transmits the retrieved data to the microprocessor 150 as a status response (S124).

On the other hand, in the case of an SRAM MISS (where the requested control information is not held in the SRAM 1304), the cache controller 130 retrieves the data from the specified address of the cache memory (DRAM) 140 (S125) and transmits the retrieved data to the microprocessor 150 as a status response (S126).

Next, the microprocessor 150 refers to the control information retrieved from the DRAM 140 or the SRAM 1304 to determine whether the data requested to be written to the specified address is held in the cache memory 140 (S127).

As a result of determination, if the requested user data is held in the cache memory 140, the microprocessor 150 proceeds to step S129. On the other hand, if the requested user data is not held in the cache memory 140, the microprocessor 150 retrieves the user data requested to be written to the specified address from, for example, the disk unit 200, writes the retrieved data to the cache memory 140 (S128), and proceeds to step S129. Specifically, at step S128, the microprocessor 150 requests the disk adapter 120 to turn on the DMA. The disk adapter 120 retrieves the data held in a storage device such as the disk unit 200 and transfers the retrieved data to a memory in the disk adapter 120 by DMA. The disk adapter 120 transfers the data received from the storage device from the memory in the disk adapter 120 to the cache memory 140 by DMA.

At step S129, the microprocessor 150 writes the user data received by the channel adapter 110 to the cache memory 140. Specifically, the microprocessor 150 requests the channel adapter 110 to turn on the DMA. The protocol chip in the channel adapter 110 requests write data to the host computer 20 and transfers the write data from the host computer to the memory in the channel adapter 110. The DMA in the channel adapter 110 retrieves the data stored in the memory in the channel adapter 110 and transfers the retrieved data to the cache memory 140 by DMA.

Then, the cache controller 130 reports the completion of the write to the host computer 20 as a status response (S130).

As understood, in order to retrieve control information required for reading or writing user data, the microprocessor 150 can access a storage area of the SRAM 1304 mapped to a memory space of the DRAM 140 by accessing the DRAM 140.

Figure 11:
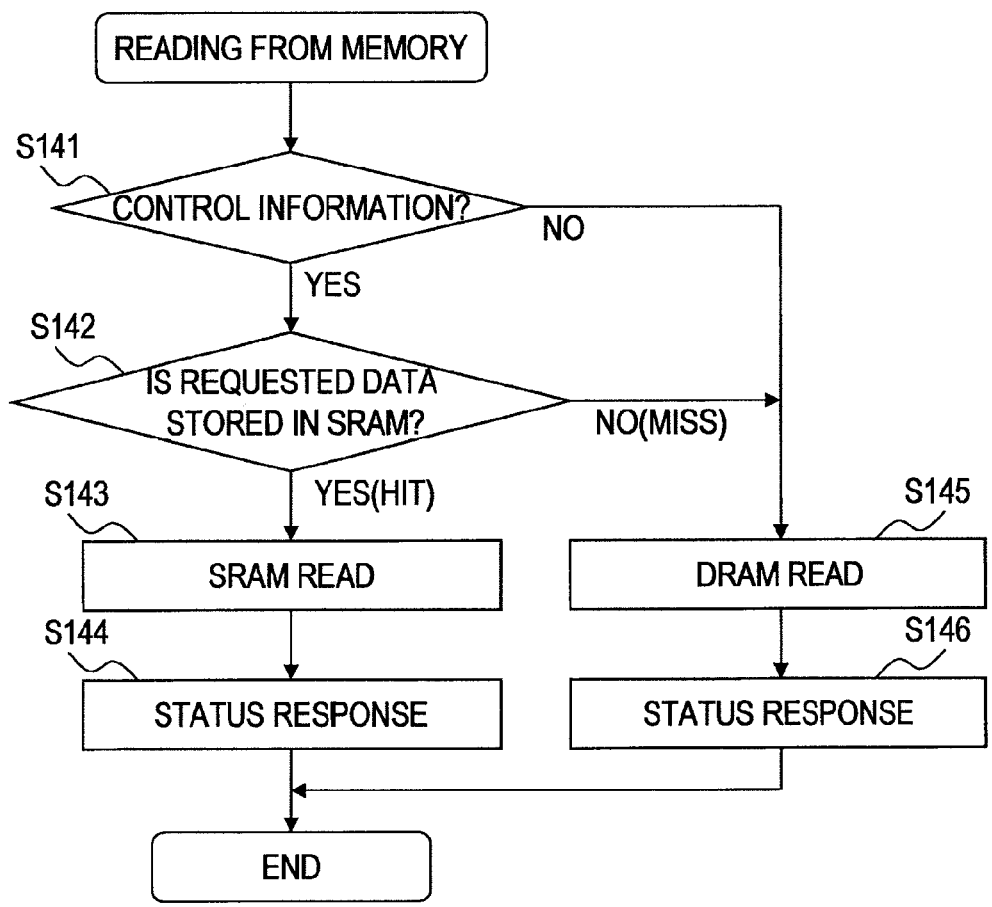
FIG. 11 is a flowchart of reading from the cache memory according to the embodiment of this invention.

FIG. 11 is a flowchart of reading from the cache memory 140 in the disk array apparatus 1 according to the embodiment of this invention; the process is executed by the cache controller 130 (or 131), for example, at steps S102 to S106 in the read process (FIG. 9) or steps S122 to S126 in the write process (FIG. 10).

When the cache controller 130 receives a packet from a microprocessor 150 that requests a read access to the cache memory 140, the determination unit 1305 refers to the area allocation information in the register 1306 to determine whether the address specified by the read request is included in the user data area or the control information area (S141).

As a result, in the case where the address of the access destination is in the user data area (NO at S141), the user data is held in the DRAM 140; accordingly, the cache controller 130 proceeds to step S145.

On the other hand, in the case where the address of the access destination is in the control information area (YES at S141), the control information is held in either the DRAM 140 or the SRAM 1304; accordingly, the determination unit 1305 refers to the mapping information in the register 1306 to determine whether the data at the address specified by the read request is held in the DRAM 140 or the SRAM 1304 (S142).

In the case of an SRAM HIT (where the requested control information is held in the SRAM 1304), the determination unit 1305 replaces the access destination of the read request received from the microprocessor 150 with the address in the SRAM 1304. The router 1301 forwards the read request packet to the SRAM controller 1303. The SRAM controller 1303 retrieves data from the replacement address in the SRAM 1304 (S143) and transmits the retrieved data to the microprocessor 150 as a status response (S144). That is to say, the cache controller 130 switches the access to the DRAM 140 to the access to the SRAM 1340.

On the other hand, in the case of an SRAM MISS (where the requested control information is not held in the SRAM 1304), the DRAM controller 1302 retrieves data at the specified address in the cache memory (DRAM) 140 (S145) and transmits the retrieved data to the microprocessor 150 as a status response (S146).

Figure 12:
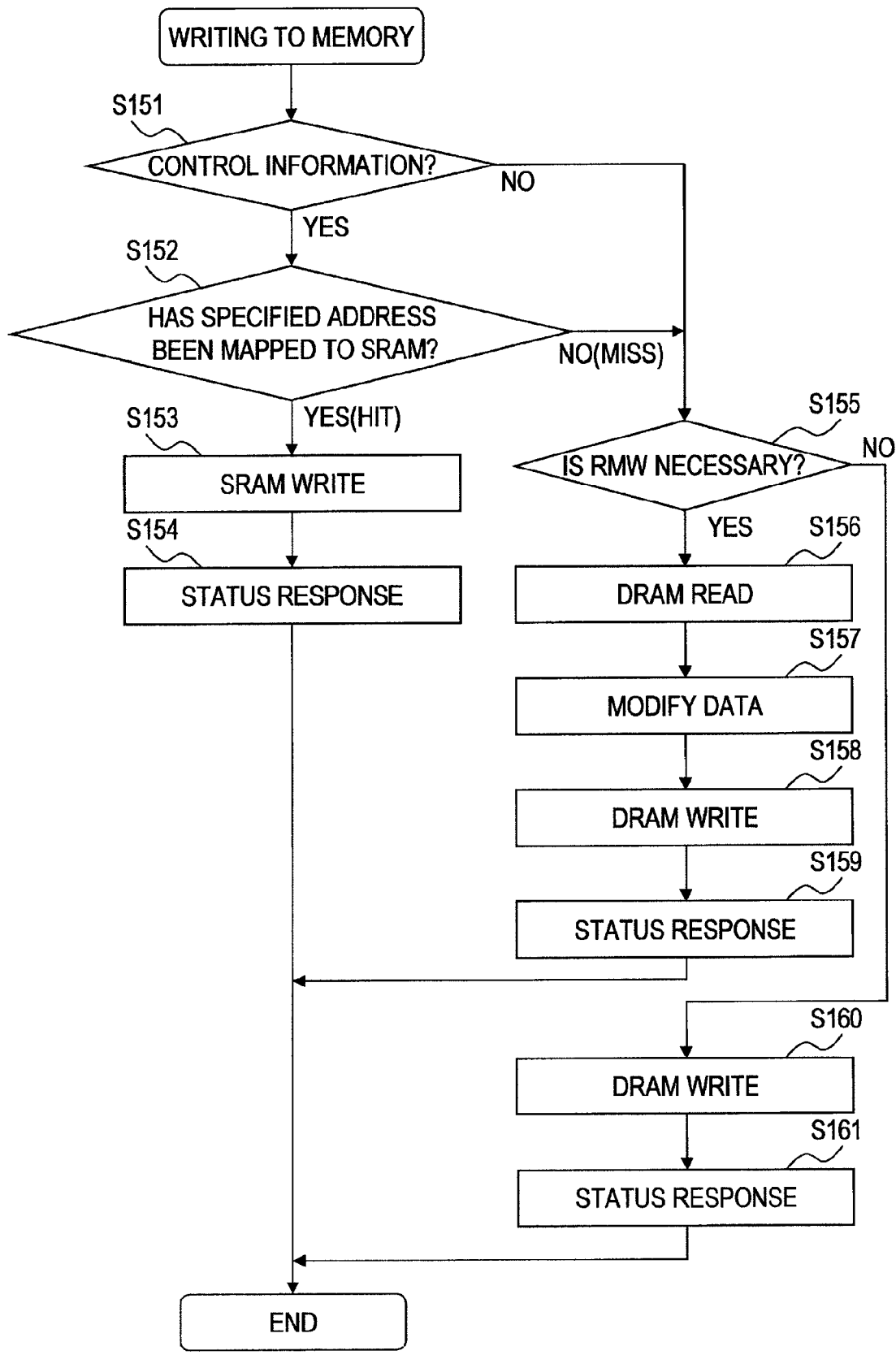
FIG. 12 is a flowchart of writing to the cache memory according to the embodiment of this invention.

FIG. 12 is a flowchart of writing to the cache memory 140 in the disk array apparatus 1 according to the embodiment of this invention; the process is executed by the cache controller 130 (or 131).

When the cache controller 130 receives a packet that requests a write access to the cache memory 140, the determination unit 1305 refers to the area allocation information in the register 1306 to determine whether the address specified by the write request is in the user data area or the control information area (S151).

In the case where the address specified by the write request is in the user data area (NO at S151), the determination unit 1305 proceeds to step S155 as the data is to be written to the DRAM 140.

On the other hand, in the case where the address specified by the write request is in the control information area (YES at S151), the control information is held in either the DRAM 140 or the SRAM 1304; accordingly, the determination unit 1305 refers to the mapping information in the register 1306 to determine whether the data at the address which is requested to write is held in the DRAM 140 or the SRAM 1304 (S152).

In the case of an SRAM HIT (the control information which is requested to write is held in the SRAM 1304), the determination unit 1305 replaces the access destination of the write request received from the microprocessor 150 with the address in the SRAM 1304. The router 1301 forwards the write request packet to the SRAM controller 1303. The SRAM controller 1303 writes the data to the replacement address in the SRAM 1304 (S153) and reports the completion of the data write to the microprocessor 150 as a status response (S154). That is to say, the cache controller 130 switches the access to the DRAM 140 to the access to the SRAM 1340.

On the other hand, in the case of an SRAM MISS (the control information which is requested to write is not held in the SRAM 1304), the DRAM controller 1302 determines whether a read-modify-write is necessary (S155). Whether a read-modify-write is necessary is determined by, for example, determining whether a read-modify-write is more efficient for the address specified by the write request and the size of the data requested to be written. Specifically, since a read-modify-write is more efficient in the case where the size of the data requested to be written is smaller than the minimum unit (line) of access, a read-modify-write is selected in such a case. Also, in the case where the start address of an access does not match the start address of a line, a read-modify-write is selected for an access to the fractional address.

As a result of the determination, if a read-modify-write is necessary, the DRAM controller 1302 retrieves the data from the address in the DRAM 140 specified by the write request (S156), rewrites a part or all of the retrieved data (S157), writes the rewritten data at the address in the DRAM 140 specified by the write request (S158), and reports the completion of the data write to the microprocessor 150 as a status response (S159).

As described, a read-modify-write executes both of a data read and a data write as a series of process for a single command. As a result, unnecessary operations may be performed to adversely affect the responsivity of the cache memory.

If a read-modify-write is not necessary, the DRAM controller 1302 writes the data at the address in the DRAM 140 specified by the write request (S160), and reports the completion of the data write to the microprocessor 150 as a status response (S161).

Figure 13:
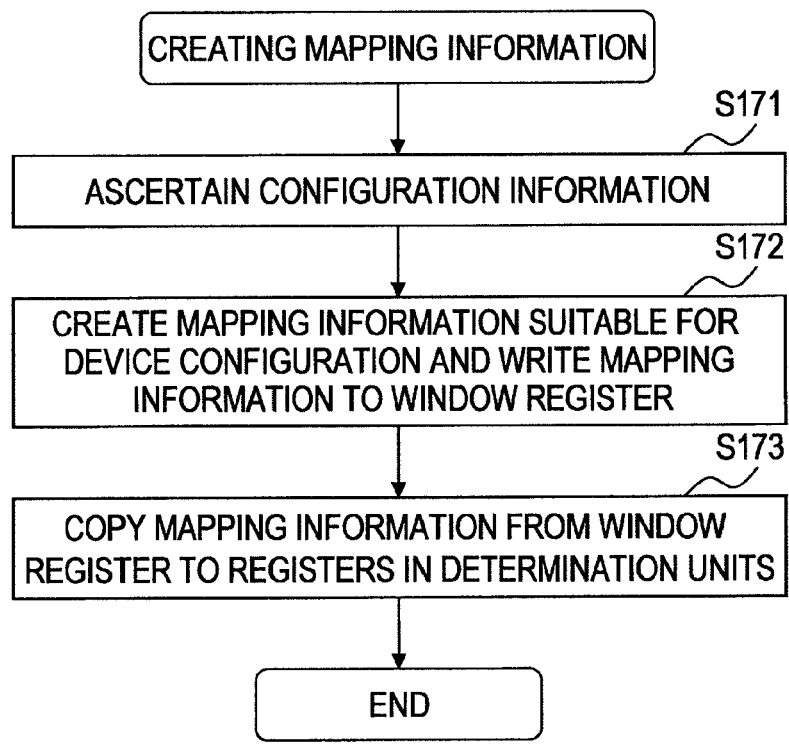
FIG. 13 is a flowchart of a process of creating mapping information according to the embodiment of this invention.

FIG. 13 is a flowchart of a process of creating mapping information according to the embodiment of this invention.

The microprocessor 150 refers to the configuration information of the control information held in the cache memory 140 to ascertain the configuration of the devices (such as the capacity of the cache memory 140) included in the disk array apparatus 1 (S171).

Next, the microprocessor 150 creates mapping information suitable for the device configuration. Specifically, the microprocessor 150 determines the kinds of control information required for the disk array apparatus 1 to work, the data length of the control information, and the order of storing the control information in the cache memory 140, and moreover, whether to store the control information in the DRAM 140 or the SRAM 1304. For instance, it determines to store information frequently accessed and information having short data length in the SRAM 1304 and to store information less frequently accessed and information having long data length in the DRAM 140. This operation determines the arrangement of the control information in the cache memory 140 for every kind of control information and determines whether to actually store the data in the DRAM 140 or the SRAM 1304. Thereafter, it associates the addresses in the SRAM 1304 with the addresses in the DRAM 140 and writes the associated addresses to the mapping information in the window register 1311 in the cache controller 130 (S172).

Then, the cache controller 130 copies the data in the window register 1311 to the registers 1306, 1308, and 1310 in the hit determination units 1305, 1307, and 1309, respectively (S173).

Such a configuration that copies data from a master register 1311 to the registers 1306, 1308, and 1310 in the hit determination units 1305, 1307, and 1309 makes it easy to assure that the registers have the same contents because, once the microprocessor writes mapping information on the SRAM 1304 to a single register, updated data are copied to all the other registers.

Figure 14:
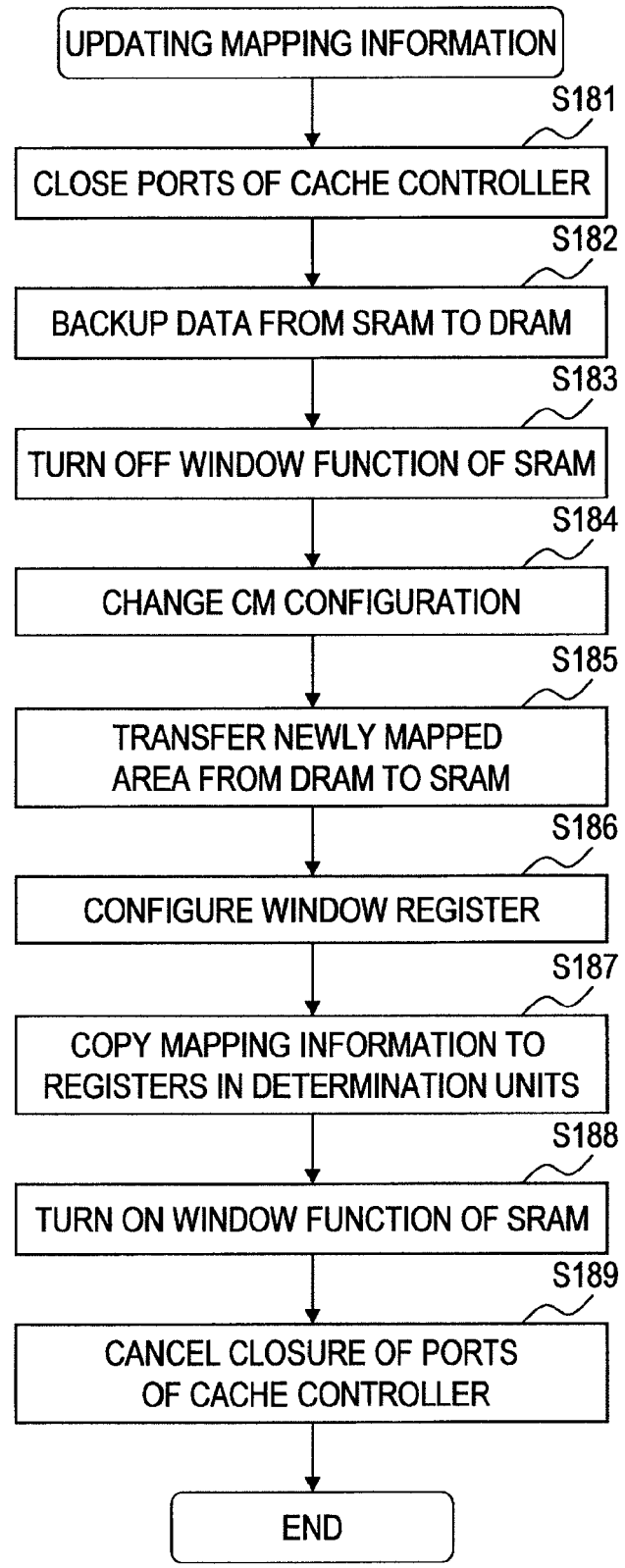
FIG. 14 is a flowchart of a process of updating the mapping information according to the embodiment of this invention.

FIG. 14 is a flowchart of a process of updating the mapping information according to the embodiment of this invention; this process accompanies a change in the configuration of the disk array apparatus 1.

First, the microprocessor 150 closes the input and output ports of the cache controller 130 to stop inputting data to and outputting data from the cache controller 130 (S181). The microprocessor 150 writes the data held in the SRAM 1304 to the same address in the DRAM 140 to backup the data held in the SRAM 1304 (S182). For this backup operation, the DRAM 140 preliminarily has a storage area having the same capacity as that of the SRAM 1304 in order to backup the data held in the SRAM 1304 to the DRAM 140.

Next, the microprocessor 150 turns off the window function of the SRAM 1304 (S183). This operation prevents an access to the DRAM 140 from being switched to the access to the SRAM 1304.

Next, the microprocessor 150 changes the configuration of the devices included in the disk array apparatus 1 (S184). For example, the disk array apparatus 1 has a register for managing the capacity of the cache memory 140 included therein; the microprocessor 150 rewrites a value in this register to change the capacity available to be used as a cache memory in a physically mounted DRAM. The microprocessor 150 updates the configuration information (FIG. 7) with the configuration change of the devices.

It should be noted that the capacity of the cache memory may be increased or decreased by physically adding or removing a RAM board (such as a DIMM) instead of by logically changing the devices. In this case, the microprocessor 150 automatically detects the configuration change in the devices and updates the configuration information (FIG. 7) based on the ascertained configuration.

Next, the microprocessor 150 newly determines the areas to be mapped in the SRAM 1304 and transfers data held in the determined areas from the DRAM 140 to the SRAM 1304 (S185). The microprocessor 150 writes the start addresses and the end addresses of the areas which had contained the data copied to the SRAM 1304 to the mapping information in the window register 1311 (S186). As to the order of execution of the steps S185 and S186, the mapping information may be created in accordance with the contents of transferred data after the transfer of the data; otherwise, the mapping information may be created first and then the data may be transferred in accordance with the created mapping information.

Then, the cache controller 130 copies the data in the window register 1311 to the registers 1306, 1308, and 1310 in the hit determination units 1305, 1307, and 1309 (S187).

Finally, the microprocessor 150 turns on the window function of the SRAM 1305 and resumes address conversion from the addresses in the DRAM 140 to the addresses in the SRAM 1304 (S188). The microprocessor 150 releases the closure of the input and output ports of the cache controller 130 to resume inputting data to and outputting data from the cache controller 130 (S189).

A specific method of changing the mapping information at a change of the capacity of the cache memory will be explained.

For example, in adding a DRAM 140 for the cache memory, the cache controller 130 maps storage areas for the control information which is expected to be accessed frequently in the control information on the added DRAM 140 in the SRAM 1304 and stores the information accessed less frequently in the control information which have been mapped in the SRAM 1304 so far to the DRAM 140.

In removing a DRAM 140 for the cache memory, the cache controller 130 releases the storage area of the control information on the DRAM 140 to be removed and maps the information frequently accessed in the control information in the SRAM 1304.

FIG. 15 is an explanatory diagram for illustrating an example of mapping information according to the embodiment of this invention and exemplifies mapping information after being updated with a configuration change.

Compared with the mapping information before the update (FIG. 5), the address "10000600-100007ff" in the DRAM is allocated for control information on the added DRAM 2. This storage area is mapped to the address "000400-0005ff" in the SRAM 1304, and the control information is stored at the address "000400-0005ff" in the SRAM 1304.

Because of this addition of the control information on the DRAM 2, the addresses to store the control information subsequent to the control information on the DRAM 2 are changed.

FIG. 16 is a flowchart of another process of updating mapping information according to the embodiment of this invention; the process is based on statistics information.

First, the microprocessor 150 closes the input and output ports of the cache controller 130 to stop inputting data to and outputting data from the cache controller 130 (S201). The microprocessor 150 writes the data held in the SRAM 1304 to the same address in the DRAM 140 to backup the data held in the SRAM 1304 (S202). For this backup operation, the DRAM 140 preliminarily has a storage area having the same capacity as that in the SRAM 1304 in order to backup the data held in the SRAM 1304 to the DRAM 140.

Next, the microprocessor 150 turns off the window function of the SRAM 1304 (S203). This operation prevents an access to the DRAM 140 from being switched to the access to the SRAM 1304.

Next, the microprocessor 150 retrieves the statistics information on the control information having short data length (S204). This is because mapping a storage area for control information having short data length to the SRAM 1304 results in storing the control information in the SRAM 1304 to improve access performance to the control information.

Then, the microprocessor 150 locates an area including control information accessed frequently with reference to the retrieved statistics information, determines the located area to be newly mapped in the SRAM 1304, and transfers the data held in the determined area in the DRAM 140 to the SRAM 1304 (S205). For example, the statistics information (FIG. 8) updated at every access to the cache memory 140 is information accessed frequently and having a short data length.

The microprocessor 150 writes the start address and the end address of the area which had contained the data copied to the SRAM 1304 to the mapping information in the window register 1311 in the cache controller 130 (S206). As to the order of execution of steps S205 and S206, the mapping information may be created in accordance with the contents of transferred data after the transfer of the data; otherwise, the mapping information may be created first and then the data may be transferred in accordance with the created mapping information.

Next, the cache controller 130 copies the data in the window register 1311 to the registers 1306, 1308, and 1310 in the hit determination units 1305, 1307, and 1309 (S207).

Finally, the microprocessor 150 turns on the window function of the SRAM 1304 and resumes address conversion from the addresses in the DRAM 140 to the addresses in the SRAM 1304 (S208). The microprocessor 150 releases the closure of the input and output ports of the cache controller 130 to resume inputting data to and outputting data from the cache controller 130 (S209).

FIG. 17 is an explanatory diagram for illustrating an example of mapping information according to the embodiment of this invention and exemplifies the mapping information after an update based on the statistics information.

Compared with the mapping information before the update (FIG. 5), control information 0 and 1 accessed frequently are mapped in the storage area in the SRAM 1304.

That is to say, at step S205, the control information 0 and 1 with high access frequency are determined to be accessed frequently and the addresses "10001000-100011ff" and "10001200-100012ff" in the DRAM 140 holding the control information are mapped to the addresses "000300-0004ff" and "000500-0005ff", respectively, in the SRAM 1304.

As a result, the control information with lower access frequency (such as the control information on the DRAM 1 and the control information 0 on the overall system) than the control information 0 and 1, which are accessed frequently, is kicked out from the SRAM 1304.

Figure 18:
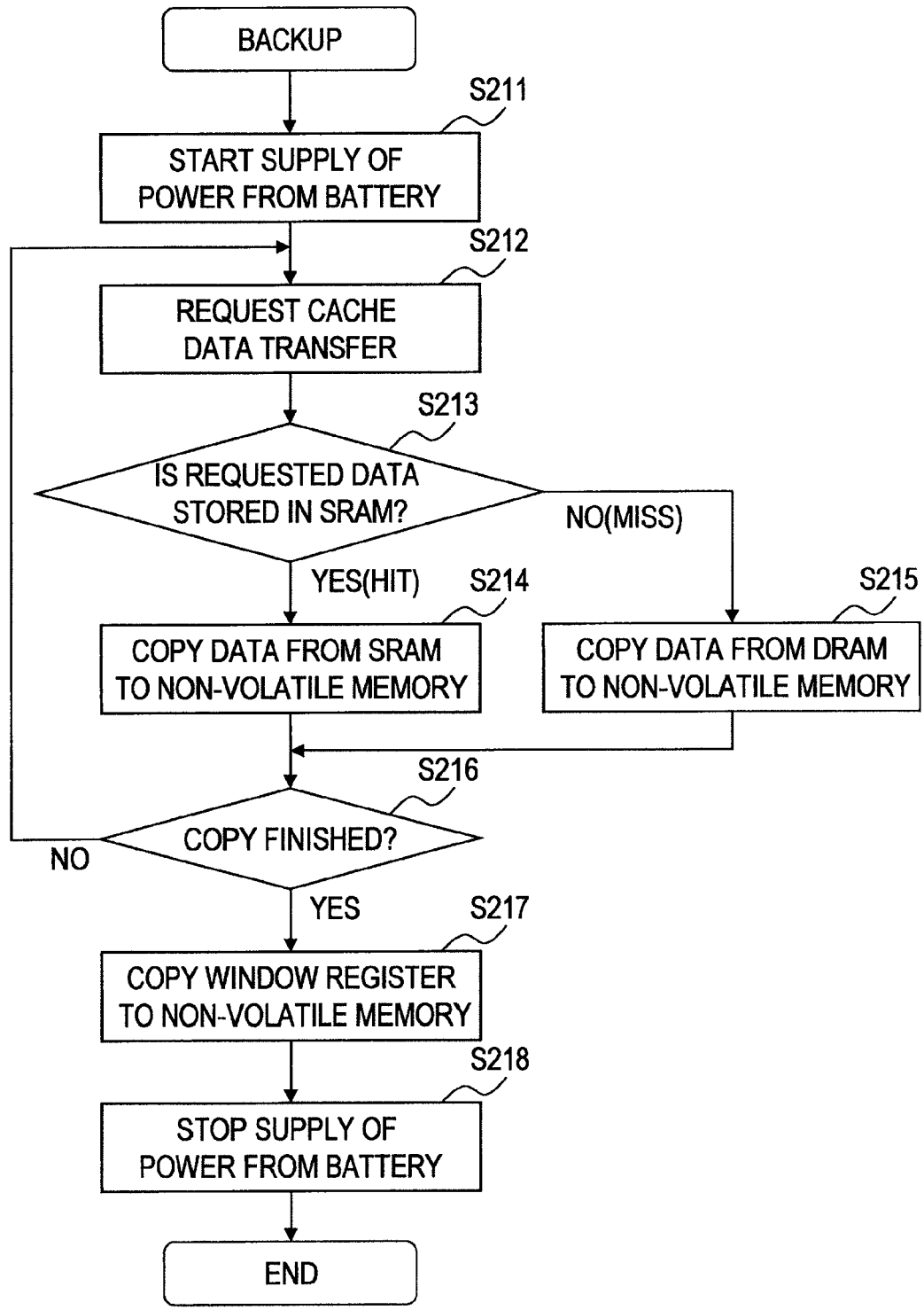
FIG. 18 is a flowchart of a process of backing up at a power failure according to the embodiment of this invention.

FIG. 18 is a flowchart of a process of backing up at a power failure according to the embodiment of this invention.

When a power failure occurs and a voltage drop of the power is detected, the battery 162 starts supplying power to the cache controller 130 and the backup system 160 (S211).

Upon a detection of a power failure, the microcomputer 161 starts a program to backup data held in the cache memory 140 and requests the cache controller 130 to transfer the data held in the cache memory 140 to the non-volatile memory 163 (S212).

When the cache controller 130 receives the data transfer request from the microcomputer 161, the determination unit 1309 determines whether the data at the address specified by the transfer request is held in the DRAM 140 or the SRAM 1304 with reference to the mapping information in the register 1310 (S213).

In the case of an SRAM HIT (where the data at the address specified by the transfer request is held in the SRAM 1304), the determination unit 1309 replaces the access destination of the data transfer request from the microcomputer 161 with the address in the SRAM 1304. The router 1301 transmits the data transfer request packet to the SRAM controller 1303. The SRAM controller 1303 retrieves data at the replacement address in the SRAM 1304 and writes the retrieved data to the non-volatile memory 163 (S214).

On the other hand, in the case of an SRAM MISS (where the data at the address specified by the transfer request is not held in the SRAM 1304), the microcomputer 161 retrieves data from the DRAM 140 through the DRAM controller 1302 and writes the retrieved data to the non-volatile memory 163 (S215).

Next, the microcomputer 161 compares the current address in process with the end address of the cache memory 140 to determine whether the data in the entire address space of the cache memory 140 has been copied to the non-volatile memory 163 (S216).

If part of the data has not been copied yet, the microcomputer 161 specifies the address to retrieve data next and returns to step S212.

On the other hand, if all of the data has been copied, the microcomputer 161 copies the data in the window register 1311 to the non-volatile memory 163 (S217). Thereafter, it stops the battery 162 from supplying power to the cache controller 130 and the backup system 160 (S218).

Figure 19:
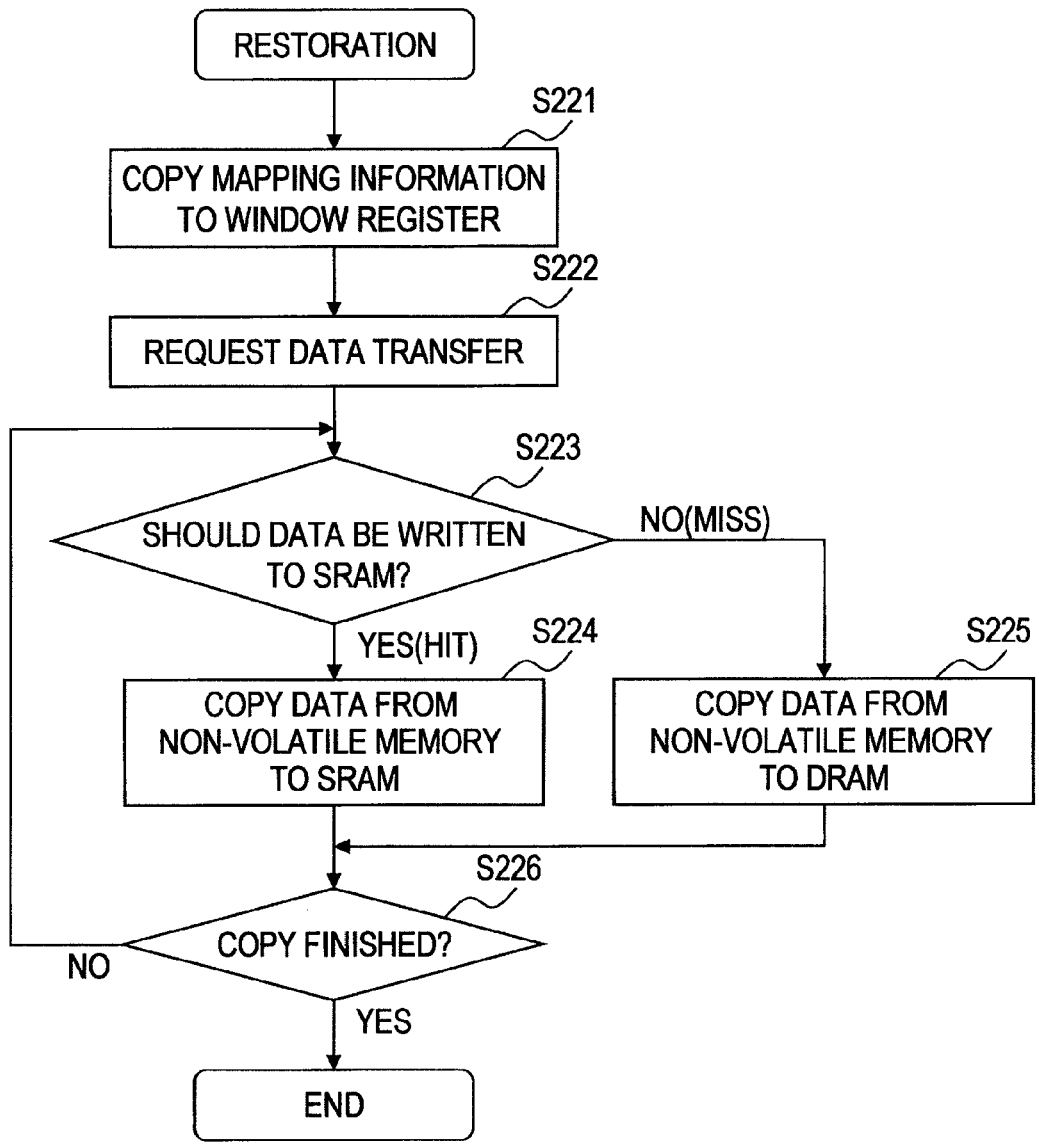
FIG. 19 is a flowchart of a process of restoration at a recovery from a power failure according to the embodiment of this invention.

FIG. 19 is a flowchart of a process of restoration at a recovery from a power failure according to the embodiment of this invention.

After recovery from a power failure, upon detection of voltage rise of power supply to a satisfactory level, the microcomputer 161 starts a program to restore data held in the non-volatile memory 163 to the cache memory 140 and copies the data of the window register held in the non-volatile memory 163 to the window register 1311 (S221). The data copied to the window register 1311 is copied to the registers 1306, 1308, and 1310 in the hit determination units 1305, 1307, and 1309, respectively.

Next, the microcomputer 161 sends the cache controller 130 a request to transfer the data held in the non-volatile memory 163 to the cache memory 140 (S222).

When the cache controller 130 receives the data transfer request from the microcomputer 161, the determination unit 1309 determines whether to write the data for the address specified by the transfer request to the SRAM 1304 or the DRAM 140 (S223). In other words, it determines whether the specified address has been mapped to the SRAM 1304.

In the case of an SRAM HIT (the data for the address specified by the transfer request is to be written to the SRAM 1304), the determination unit 1309 replaces the access destination of the data transfer request from the microcomputer 161 with the address in the SRAM 1304. The router 1301 forwards the data transfer request packet to the SRAM controller 1303. The SRAM controller 1303 writes the data retrieved from the non-volatile memory 163 to the replacement address in the SRAM 1304 and reports completion of the data write to the microprocessor 150 as a status response (S224).

On the other hand, in the case of an SRAM MISS (the data for the address specified by the transfer request is to be written to the DRAM 140), the microcomputer 161 retrieves the data from the non-volatile memory 163 and writes the data to the address in the DRAM 140 specified by the transfer request through the DRAM controller 1302 (S225).

Then, the microcomputer 161 compares the current address in process with the end address of the cache memory 140 to determine whether the data in entire address space of the cache memory 140 has been copied from the non-volatile memory 163 (S226).

If part of the data has not been copied, the microcomputer 161 designates the address to read and write data next and returns to step S223. On the other hand, if all the data has been copied, it ends the restoration process.

As set forth above, in an embodiment of this invention, the cache controller 130 includes the SRAM 1304 and the storage area of the cache memory is mapped in such a manner that data more likely to be accessed by a read-modify-write (or control information having short data length and accessed frequently) is stored in the SRAM 1304. Accordingly, the cache controller can examine the address specified by an access request from the microprocessor to the control information and switch an access to a specific address into an access to the SRAM 1304. This configuration can lower the frequency of read-modify-write, so that performance in accessing control information is improved, resulting in improvement in performance of the storage system.

In particular, the addresses of the SRAM 1304 are mapped to the address space of the DRAM 140; accordingly, the microprocessor 150 that accesses the cache memory 140 only specifies the address in the cache memory 140 (with a pointer, for example) to access the SRAM 1304. For example, in the case where the microprocessor 150 specifies an address in the cache memory 140 with a pointer, it can access the DRAM 140 or the SRAM 1304 without distinguishing one from the other.

The SRAM 1304 and the DRAM 140 can be accessed in parallel without interference by each other; consequently, conflicts between an access to user data and an access to control information are reduced, so that the performance in access to the cache memory is improved, resulting in improvement in performance of the storage system.

The hit determination unit is provided at each port of the cache controller 130 and each hit determination unit determines the memory to be accessed in accordance with the address of the access destination. This configuration achieves efficient determination of access destination. Furthermore, the hit determination units are provided at only the ports that receive accesses to the cache memory; accordingly, a simple configuration of the cache controller is achieved.

As to the registers used for hit determination, one of the registers in the cache controller is determined to be the master and the contents of the master register 1311 are copied to the registers 1306, 1308, and 1310 in the hit determination units. This configuration requires the microprocessor 150 to merely write an address to be converted into an access to the SRAM to the master register 1311; accordingly, it can be easy to assure that the registers in the hit determination units have the same contents. Even though each port includes a hit determination unit, distributed processing can be assured.

Where to store the control information is determined based on the configuration of the devices included in a storage device to configure the window register 1311; accordingly, mapping is changed automatically after a change in device configuration. The maintenance of the storage system can be simplified.

While the present invention has been described in detail and pictorially in the accompanying drawings, the present invention is not limited to such detail but covers various obvious modifications and equivalent arrangements, which fall within the purview of the appended claims.

The invention claimed is:

1. A storage system for storing data requested by a host computer to be written, the storage system comprising:
   a host interface coupled to the host computer;
   a storage device for storing the data requested by the host computer to be written;
   a disk interface connected to the storage device;
   at least one processor for processing the data requested to be written;
   a cache memory for storing the data requested by the host computer to be written; and
   a cache controller for controlling data inputs to and outputs from the cache memory, wherein:
   the cache memory includes a first memory which can be accessed by way of either access that can specify an access range by a line or access that continuously performs a read and a write;

the cache controller includes a second memory which has a higher flexibility than the first memory in specifying an access range; and the cache controller includes an access destination determination unit for determining an address of an access destination upon reception of a request for an access to the cache memory from the at least one processor;

the access destination determination unit holds access destination information which associates a storage area of the second memory with an address space of the first memory; and the cache controller is configured to:

switch a request for an access to a specific address into an access to a corresponding address in the second memory;

wherein the at least one processor is configured to:

back up data held in the second memory to the first memory;

stop a function of the access destination determination unit;

change a configuration of a device installed in the storage system or detect a change in the configuration of the device installed in the storage system;

determine a place to store control information related to the device based on configuration information after the change of the configuration of the device;

set the determined place to store the control information to the access destination information;

migrate at least part of the control information held in the first memory to the second memory in accordance with the determined place to store the control information; and resume the function of the access destination determination unit after the migration.

2. The storage system according to claim 1, wherein the at least one processor is further configured to:

determine kinds of control information required for the storage system to operate, amounts of data of the control information, and an order of storing the control information to the cache memory based on the configuration of the device installed in the storage system in a case where a device included in the storage system is changed;

determine whether to store each determined kind of control information to the first memory or the second memory; and create the access destination information based on the determination.

3. The storage system according to claim 1, further comprising a counter for counting the number of accesses to storage areas of the second memory, wherein the at least one processor is configured to:

back up data held in the second memory to the first memory;

stop a function of the access determination unit;

specify a storage area of the second memory to which the number of accesses is great with reference to the counter;

determine a place to store the control information in such a manner that data in the specified storage area is stored to the second memory;

set the determined place to store the control information to the access destination information;

migrate at least part of the control information held in the first memory to the second memory in accordance with the determined place to store the control information; and resume the function of the access destination determination unit after the transferring.

4. The storage system according to claim 1, wherein:

the storage system comprises a plurality of processors:

the cache controller includes a plurality of processor interfaces coupled to each of the plurality of processors and a plurality of access destination determination units coupled to each of the plurality of processor interfaces;

each of the plurality of access destination determination units holds access destination information to determine an access destination;

the cache controller holds master access destination information;

each of the access destination determination units determines whether a request for an access to the first memory from each of the plurality of processors inputted to each of the plurality of processor interfaces is to be accessed to the first memory or to the second memory in accordance with the address of the access destination;

at least one of the plurality of processors updates the master access destination information upon updating the access destination information; and the cache controller copies the updated master access destination information to the access destination information other than the master.

5. A control method in a storage system for storing data requested by a host computer to be written, the storage system including:

a host interface coupled to the host computer;

a storage device for storing the data requested by the host computer to be written;

a disk interface connected to the storage device; at least one processor for processing the data requested to be written;

a cache memory for storing the data requested by the host computer to be written; and a cache controller for controlling data inputs to and outputs from the cache memory, the cache memory including a first memory which can be accessed by way of either access that can specify an access range by a line or access that continuously performs a read and a write, the cache controller including a second memory which has a higher flexibility than the first memory in specifying an access range, the control method including the steps of:

determining, by an access destination determination unit of the cache controller, an address of an access destination upon reception of a request for access to the cache memory from the at least one processor;

holding, by the access destination determination unit, access destination information which associates a storage area of the second memory with an address space of the first memory;

switching, by the cache controller, a request for an access to a specific address into an access to a corresponding address in the second memory;

backing UP, by the at least one processor, data held in the second memory to the first memory;

stopping, by the at least one processor, a function of the access determination unit;

changing, by the at least one processor, a configuration of a device installed in the storage device or detecting a change in the configuration of the device installed in the storage system;

determining, by the at least one processor, a place to store control information related to the device based on configuration information after the change of the configuration of the device;

setting, by the at least one processor, the determined place to store the control information to the access destination information;

migrating, by the at least one processor, at least part of the control information held in the first memory to the second memory in accordance with the determined place to store the control information; and resuming, by the at least one processor, the function of the access destination determination unit after the migration.

6. The control method of the storage system according to claim 5, wherein the step of determining a place to store control information includes the steps of:

determining, by the at least one processor, kinds of control information required for the storage system to operate, amounts of data of the control information, and an order of storing the control information to the cache memory based on the configuration of the device installed in the storage system in a case where a device included in the storage system is changed;

determining, by the at least one processor, whether to store each determined kind of control information to the first memory or the second memory; and creating, by the at least one processor, the access destination information based on the determination.

7. The control method of the storage system according to claim 5, wherein:

the storage system further includes a counter for counting the number of accesses to storage areas of the second memory; and the control method further includes the steps of:

backing up, by the at least one processor, data held in the second memory to the first memory;

stopping, by the at least one processor, a function of the access determination unit;

specifying, by the at least one processor, a storage area of the second memory to which the number of accesses is great with reference to the counter;

determining, by the at least one processor, a place to store the control information in such a manner that data in the specified storage area is stored to the second memory;

setting, by the at least one processor, the determined place to store the control information to the access destination information;

migrating, by the at least one processor, at least part of the control information held in the first memory to the second memory in accordance with the determined place to store the control information; and resuming, by the at least one processor, the function of the access destination determination unit after the transferring.

8. The control method of the storage system according to claim 5, wherein:

the storage system further includes a plurality of processors;

the cache controller includes a plurality of processor interfaces coupled to each of the plurality of processors and a plurality of access destination determination units coupled to each of the plurality of processor interfaces;

each of the plurality of access destination determination units holds access destination information to determine an access destination;

the cache controller holds master access destination information; and the control method further includes the steps of:

determining, by each of the access destination determination units, whether a request for an access to the first memory from each of the plurality of processors inputted to each of the plurality of processor interfaces is to be accessed to the first memory or to the second memory in accordance with the address of the access destination;

updating, by at least one of the plurality of processors, the master access destination information upon updating the access destination information; and copying, by the cache controller, the updated master access destination information to the access destination information other than the master.

* * * * *